(12) United States Patent
Nicolino

(10) Patent No.: US 7,600,788 B2
(45) Date of Patent: Oct. 13, 2009

(54) FAST-FIT COUPLING FOR A FLUID CIRCULATION SYSTEM

(75) Inventor: Aldo Nicolino, Caselette (IT)

(73) Assignee: Pres-Block, S.p.A., Caselett (IT)

( * ) Notice: Subject to any disclaimer, the term of this patent is extended or adjusted under 35 U.S.C. 154(b) by 412 days.

(21) Appl. No.: 11/556,567

(22) Filed: Nov. 3, 2006

(65) Prior Publication Data

US 2007/0108764 A1    May 17, 2007

(30) Foreign Application Priority Data

Nov. 4, 2005    (EP) .................................. 05425776

(51) Int. Cl.
*F16L 19/08* (2006.01)
*F16L 21/05* (2006.01)
*F16L 21/08* (2006.01)

(52) U.S. Cl. .................... 285/89; 285/340; 285/360; 285/361; 285/362

(58) Field of Classification Search .................. 285/81, 285/89, 322, 340, 360, 361, 362
See application file for complete search history.

(56) References Cited

U.S. PATENT DOCUMENTS

| | | | | |
|---|---|---|---|---|
| 3,633,944 A * | 1/1972 | Hamburg | .................... | 285/81 |
| 4,635,975 A | 1/1987 | Campbell | | |
| 4,911,406 A * | 3/1990 | Attwood | ..................... | 251/148 |
| 4,919,457 A * | 4/1990 | Moretti | ........................ | 285/39 |
| 4,993,755 A * | 2/1991 | Johnston | .................... | 285/315 |
| 5,292,157 A * | 3/1994 | Rubichon | .................... | 285/39 |
| 5,890,749 A | 4/1999 | Fukaya et al. | | |
| 5,911,443 A * | 6/1999 | Le Quere | ....................... | 285/3 |
| 7,434,846 B2 * | 10/2008 | Baumgartner | ............... | 285/319 |
| 7,455,330 B2 * | 11/2008 | Baumgartner | ............... | 285/340 |
| 2003/0001383 A1 * | 1/2003 | Halama | ........................ | 285/39 |
| 2003/0111840 A1 * | 6/2003 | O'Neill et al. | ............... | 285/340 |
| 2005/0077723 A1 * | 4/2005 | Wai | ............................. | 285/93 |
| 2006/0125235 A1 * | 6/2006 | Andre | ........................ | 285/340 |
| 2006/0232067 A1 * | 10/2006 | Kwak | ......................... | 285/354 |

FOREIGN PATENT DOCUMENTS

| | | |
|---|---|---|
| EP | 0 245 233 | 11/1987 |
| EP | 1 041 332 | 10/2000 |
| GB | 2071798 A * | 9/1981 |
| GB | 2 177 174 | 1/1987 |

\* cited by examiner

*Primary Examiner*—James M Hewitt
(74) *Attorney, Agent, or Firm*—Louis C. Cullman, Esq.; K&L Gates LLP

(57) ABSTRACT

A fast-fit coupling for a fluid circulation system comprising at least two conveying members of a fluid. The coupling comprises: a receiving body for each conveying member; way for fastening carried by the body, shiftable by the conveying member during the insertion of the conveying member, and integral with the conveying member when the conveying member is moved in a disconnection direction from the body; way for locking cooperating with the way for fastening to lock the conveying member in a position inside the body and to prevent the body itself from being disconnected; and way for releasable constraint, activatable for restraining the way for locking to the body and preventing the conveying member to be disconnected, and deactivatable to disconnect the way for locking and allowing the conveying member to be disconnected; the way for locking and the body are engageable/disengageable by ways of a relative rotation less than ninety degrees.

7 Claims, 3 Drawing Sheets

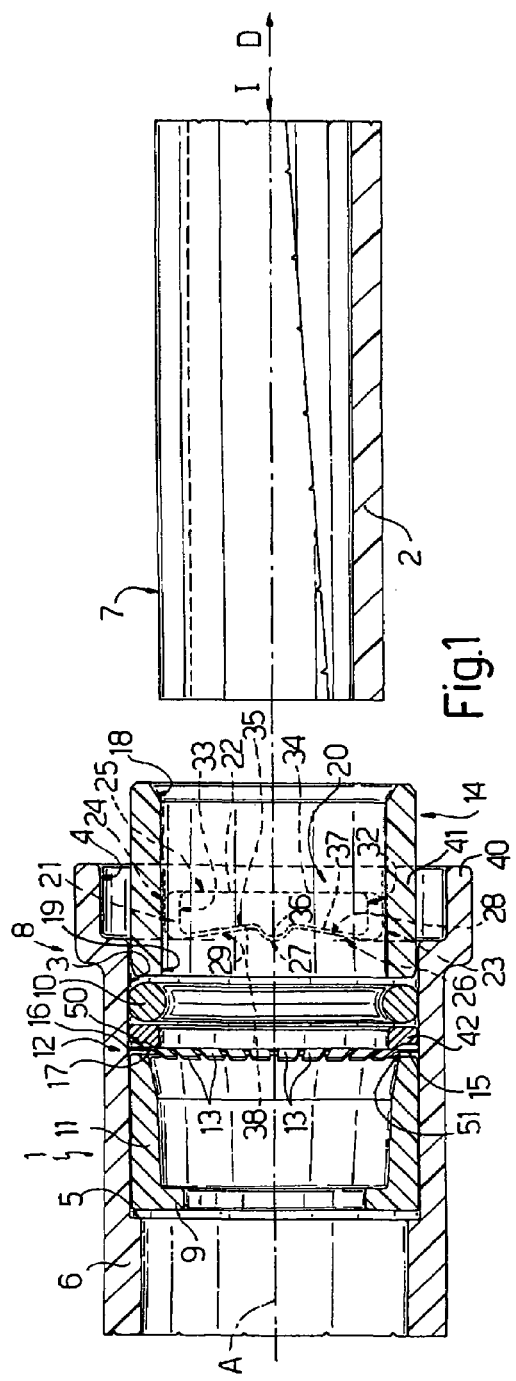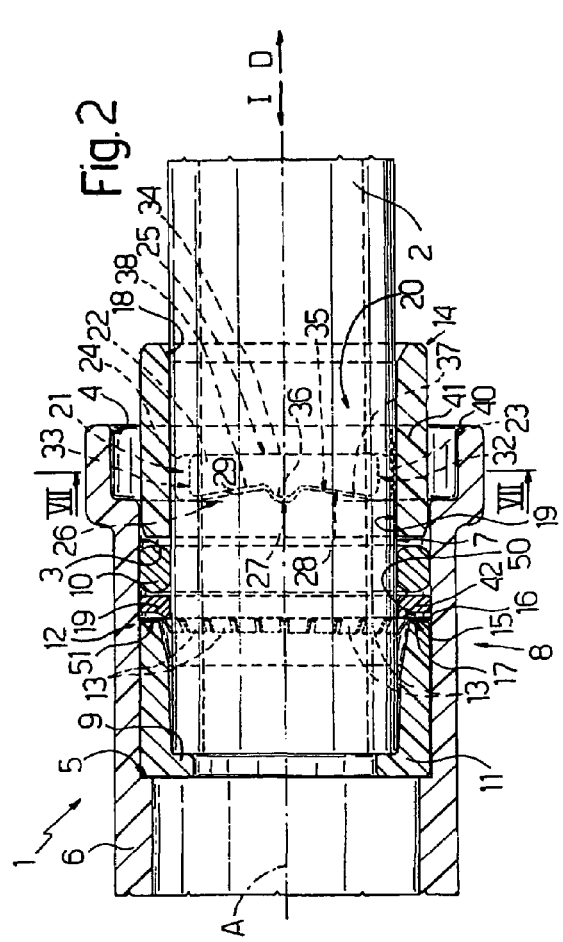

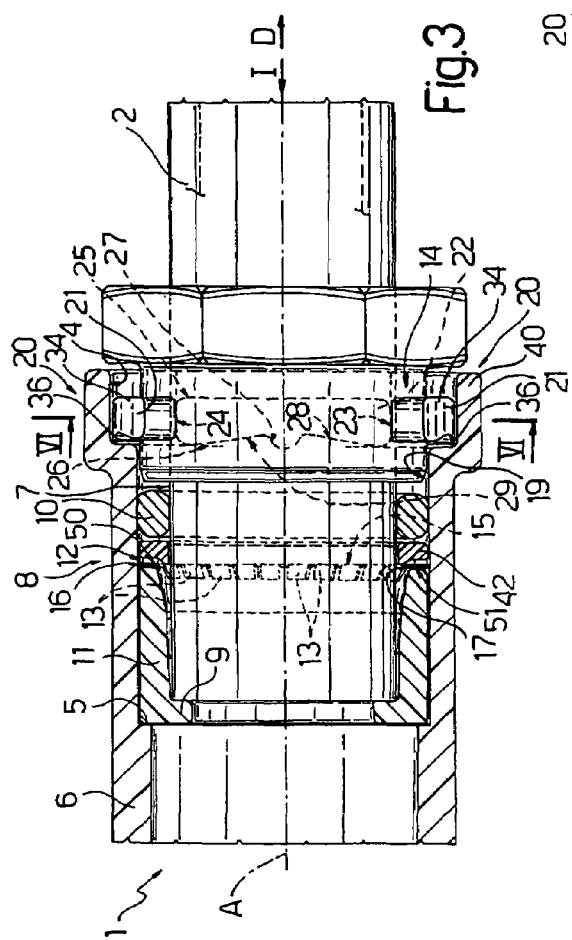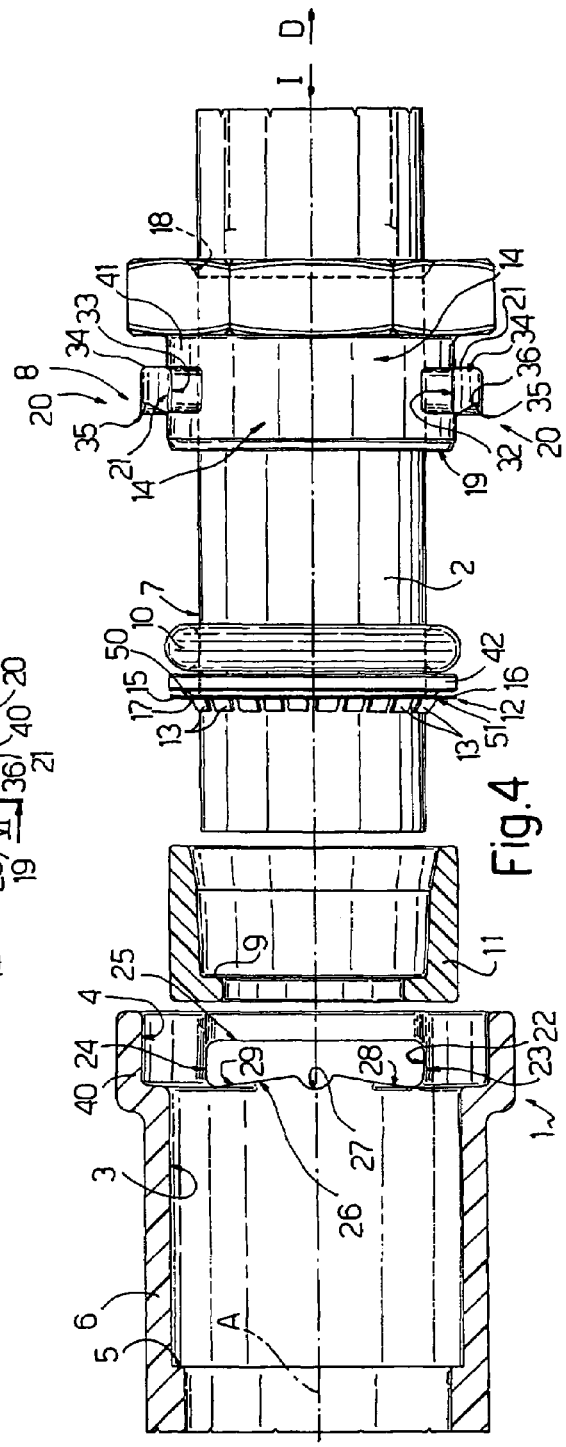

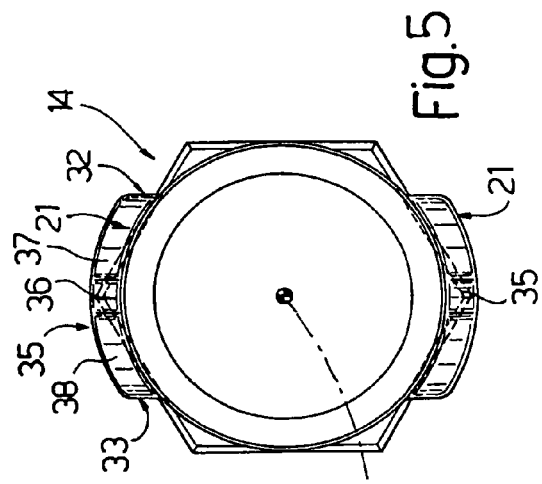
Fig.5
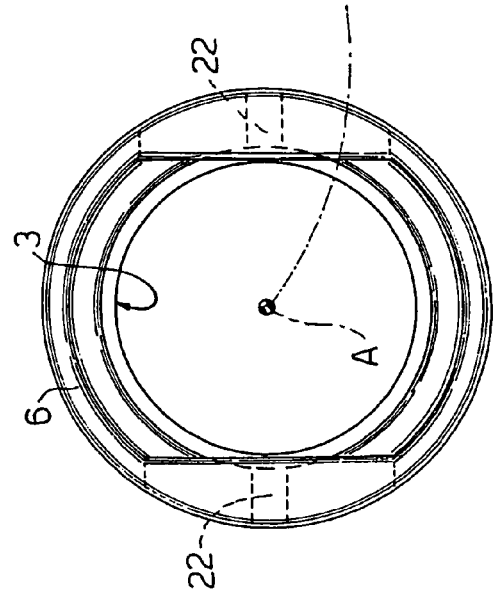
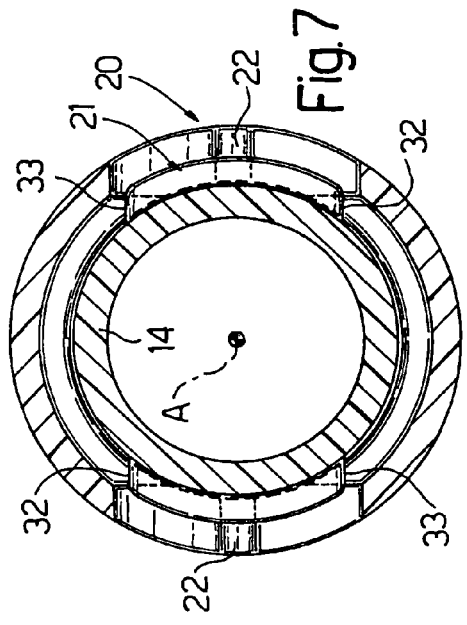
Fig.7
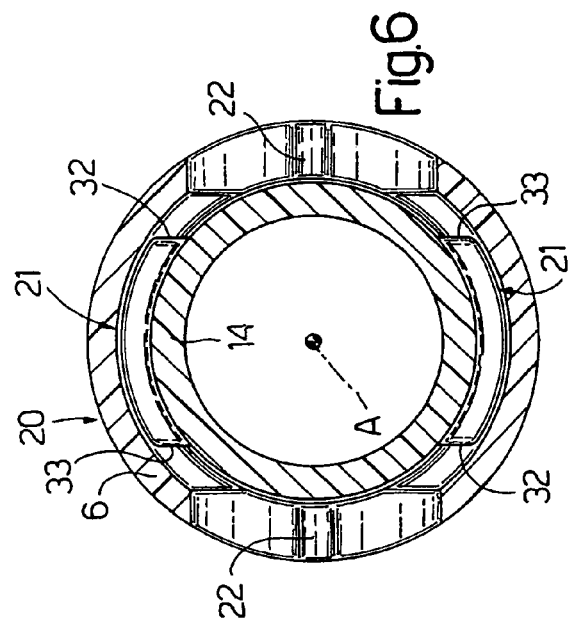
Fig.6

FAST-FIT COUPLING FOR A FLUID CIRCULATION SYSTEM

BACKGROUND OF THE INVENTION

The present application claims priority to European Patent Application No. 05425776.1, filed Nov. 4, 2005, which is incorporated by reference herein in its entirety.

The present invention relates to a fast-fit coupling for a fluid circulation system.

There are known fast-fit couplings adapted to provide the fluid connection between two or more fluid conveying pipes, while allowing the fast insertion/disconnection of each pipe in the coupling itself.

In greater detail, the coupling comprises a receiving body defining a plurality of conduits adapted to be engaged by respective fluid conveying pipes and a plurality of openings adapted to allow the insertion/disconnection of each pipe inside a respective conduit.

The coupling also comprises, for each conduit, a fastening ring provided with a plurality of fins adapted to be shifted from the relative position according to an insertion direction of the pipe itself so as to prevent the further advancement of the pipe itself, a sealing ring adapted to fluid-tightly abut against a side surface of the respective pipe so as to prevent the leakage of fluid, and a sliding locking member inside the body and adapted to cooperate with the pipe on the part opposite to the fastening ring to lock the respective pipe in a predetermined position. More precisely, the locking member is available in a first operative position, in which it locks the pipe on the opposite side of the fastening ring preventing the pipe to be disconnected in the opposite direction to the connection direction, and in a second operative position, in which it does not withhold the pipe on the side opposite to the fins allowing the pipe to be disconnected from the conduit.

In particular, each locking member is placed adjacent to the respective opening and each fastening ring is interposed between the sealing ring and the locking member.

During insertion of each pipe, the locking member is available in the first operative position, and each pipe is inserted in the respective coupling body so as to determine the sliding of the pipe itself firstly on the respective fastening ring and then on the sealing ring to reach the predetermined locking position.

The disconnection of each pipe from the respective conduit occurs by bringing the locking member to the second operative position and pulling out, through the respective aperture, the pipe along with the sealing ring and the locking ring.

The couplings of the known type provide a suboptimal fluid tightness, in particular when the pipes are made of plastic material. More precisely, the sliding of the side surface of the pipes on the fastening ring scratches the side surface and alters its shape. As a result, the fins on the sealing ring do not fluid-tightly abut against the side surface of the respective pipe and, therefore, spillage and/or leakage of fluid may occur.

In order to remove such drawback, couplings in which the sealing ring and the fastening ring present exchanged positions along the insertion/disconnection direction of the pipe are known. In this way, during insertion of each pipe, the respective side surface slides firstly on the sealing ring and then on the fastening ring; therefore, the fluid tightness provided by the coupling is optimal because the possible scratches on the side surface generated by the relative sliding between pipe and fins do not cooperate with the sealing ring.

Such couplings are available in a first embodiment in which each locking member is fastened to the body of the coupling so as to lock, on opposite side of the respective fastening ring, the respective pipe in the predetermined locking position. Such first embodiment presents the drawback of not allowing the pipes to be disconnected from the respective conduits.

In a second embodiment, each locking member is releasably constrained to the coupling body so as to be available in a first operative position, in which it locks the respective pipe in the predetermined locking position, and in a second operative position, in which it does not withhold the pipe in the predetermined locking position allowing the pipe itself to be disconnected.

Each locking member is moved between the first and the second operative positions by means of a threaded connection arranged between each locking member and the coupling body.

Operating the threaded connection requires the relative rotation of the releasing member with respect to the coupling itself according to a predetermined number of turns. Therefore, the disconnection of each pipe from the respective conduit is awkward in difficulty accessible spaces.

SUMMARY OF THE INVENTION

It is the object of the present invention to construct a fast-fit coupling for a fluid circulation system, which allows the drawbacks related to the fast-fit couplings of the known type to be solved in a straightforward, inexpensive manner.

The abovementioned object is achieved by the present invention in that it relates to a fast-fit coupling for a fluid circulation system as defined in the attached claims.

BRIEF DESCRIPTION OF THE DRAWINGS

For a better understanding of the present invention, it will now be described a preferred embodiment by way of non-limitative example, and with reference to the accompanying drawings, in which:

FIGS. 1 and 2 show in axial section respective insertion positions of a pipe in a fast-fit coupling according to the invention;

FIGS. 3 and 4 show in axial section respective disconnection positions of the pipe from the fast-fit coupling in FIGS. 1 and 2;

FIG. 5 shows a frontal view of two details in FIG. 1;

FIG. 6 is a section taken along line VI-VI in FIG. 3; and

FIG. 7 is a section taken along line VII-VII in FIG. 2.

DETAILED DESCRIPTION OF THE INVENTION

With reference to figures from 1 to 4, it is indicated as a whole by 1 a fast-fit coupling for a fluid circulation system of which only a fluid conveying pipe 2 is shown.

The coupling 1 is adapted to reciprocally and fluid-tightly connect a plurality of pipes 2, and is defined by a hollow body 6 comprising a plurality of cylindrical conduits 3 (only one of which is shown) having respective axes A and adapted to be releasably engaged by respective pipes 2.

The description that follows will make reference, for simplicity's sake, without loosing in generality, to a single conduit 3 and to a single pipe 2.

The conduit 3 is open outwards through an opening 4 adapted to allow the pipe 3 to be inserted/disconnected according to respective connection directions I, D reciprocally opposite and arranged in use parallelly to axis A, and presents a shoulder 5 arranged on the opposite side of the opening 4 and recessed on an inner wall of the conduit 3 towards the axis A.

The coupling 1 comprises a locking assembly 8 adapted to lock the pipe 2 in a predetermined position inside the conduit 3, a sealing ring 10 adapted to fluid-tightly cooperate with a side surface 7 of the pipe 2 to prevent spillage of fluid, and an annular socket 11 presenting a recess 9 adapted to abut against the shoulder 5 and to define a stop position for the pipe 2 during insertion of the pipe 2 in the conduit 3 itself according to direction D.

As shown in figures from 1 to 4, the locking assembly 8, the sealing ring 10 and the socket 11 are adapted to be accommodated inside the conduit 3 during the connection and use step of the pipe 2 (figures from 1 to 3), and are integrally extractable from the pipe 2 during the disconnection step of the pipe 2 itself from the conduit 4 (FIG. 4).

In greater detail, the locking assembly 8 comprises a fastening ring 12 provided with a plurality of circumferential fins 13 (only two of which are shown in figures from 1 to 4) adapted to be shifted and engaged by the pipe 2 during the connection of the pipe 2 itself, and a locking member 14 adapted to be releasably connected to the inner surface of the conduit 3 so as to cooperate with the fins 13 to prevent the pipe 2 from being pulled out from the conduit 3 in direction opposite to the direction of insertion.

More precisely, the fastening ring 12 extends about an axis coinciding in use with axis A and presents opposite openings of axial ends 50, 51 adapted to be crossed in use by pipe 3.

The fastening ring 12 is adapted to be inserted inside the conduit 3 so that the opening 51 is adjacent to the socket 11 and the opening 50 faces an annular spacer 42, which is fittable inside the coupling 3 in a position axially interposed between the sealing ring 10 and the fastening ring 12.

The fastening ring 12 further comprises a discoidal body 15 adapted to be fastened, at an edge 16, onto the inner wall of the conduit 3, and protrudingly carrying the fins 13, at an edge 17 radially more internal with respect to the edge 16.

More specifically, the fins 13 extend from the edge 17 and obliquely converge towards the axis of the fastening ring 12. The fins 13 also extend from the fastening ring 12 on opposite side of the opening 50. In this way, during insertion of the pipe 2 in the conduit 4 in the direction of the shoulder 5, the fins 13 can shift towards the shoulder 5, while during disconnection of the pipe 2 in direction of the opening 4, the fins 13 move integrally with the pipe 2 itself inside the conduit 3.

Advantageously, the sealing ring 10 is axially interposed between the fastening ring 12 and the locking member 14. In this way, in the case of pipes 2 made of plastic material, the scratches provided on the surface of the pipes 2 during sliding thereof on the fins 13 of the fastening ring 12 do not cooperate with the sealing ring 10. Therefore, the possible fluid leakage along such scratches cannot pass through the sealing ring 10.

The locking member 14 has an annular shape and presents opposite openings 18, 19 of axial ends adapted to allow the crossing of the pipe 3.

The locking member 14 is adapted to be coaxially fixed inside the conduit 3 at the opening 18, and to be accommodated with clearance inside a thickening 40 of the conduit 3 at an intermediate portion 41 between the openings 18 and 19, and to partially project from the conduit 3 to allow a pipe 2 to be inserted inside the conduit 3 through the opening 19.

Furthermore, the locking member 14 can be releasably coupled to the body 6 of the coupling 1. In this way, when the locking member 14 is fastened to the body 6 of the coupling 1 (FIGS. 1 and 2), the pipe 2 remains fastened into the conduit 3 in a predetermined locking position by the fins 13 and the locking member 14.

Otherwise, when the locking member 14 is disconnected from the body of the coupling 1 (FIG. 3), the pipe 2 can slide towards the opening 4 and therefore can be extracted in direction D.

More precisely, the locking member 14 and the body 6 can be coupled so as to be reciprocally inserted/disconnected by a relative rotation of the locking member 14 and the body 6 themselves.

Advantageously, the relative rotation of the locking member 14 and the body 6 occurs for an arc less than ninety degrees.

In greater detail, the coupling 1 and the locking member 14 are connected together with a pair of bayonet mounts 20 (only one of which is shown in FIGS. 1 and 2) symmetrically arranged with respect to the insertion/disconnection direction of the pipe 2 in the conduit 3.

Each bayonet mount 20 comprises a seat 22 made through the body 6, and a locator member 21 externally protruding from the portion 41 of the locking member 14 and having shape complementary to the seat 22.

More precisely, the locator member 21 and the seat 22 are reciprocally coupled by determining the rotation of the locator member 21 relatively to the seat 22 inside the thickening 40 according to two reciprocally opposite angular directions.

Each seat 22 is circumferentially delimited by a pair of surfaces 23, 24 parallel to the axis A and is axially delimited by a pair of surfaces 25, 26 extending between the surfaces 23, 24.

In particular, the surface 25 is facing towards the opening 4 and lays on a plane orthogonal to the surfaces 23, 24.

The surface 26 comprises a central groove 27 and a pair of side segments 28, 29 converging from respective surfaces 23, 24 towards the groove 27 itself.

The groove 27 has an arc of circumference shape and is joined, on opposite sides, to the segment 28 and to the segment 29.

The segment 28 connects one axial end facing the opening 4 of the surface 23 at the recess 27, while the segment 29 connects one axial end facing the opening 4 of the surface 24 at the recess 27 itself.

The locator member 21 is circumferentially delimited by two pairs of surfaces 32, 33 parallelly extending to axis A and axially delimited by a pair of surfaces 34, 35 extending between the surfaces 32, 33.

In particular, the surface 34 extends towards the opening 4 and lays on a plane orthogonal to the surfaces 32, 33.

The surface 35 comprises a central ridge 36 adapted to slide on one of the segments 28, 29 so as to engage the groove 27 and withhold the locator member 21 in the seat 22, and a pair of side segments 37, 38 converging from respective surfaces 32, 33 towards the ridge 36 and adapted to cooperate respectively with the segments 28, 29 during the coupling/uncoupling of the locator member 21 and the seat 22.

In particular, the ridge 36 presents an arc of circumference shape and is joined, by its opposite sides, to segments 37, 38.

The segment 37 connects one axial end facing the opening 19 of the surface 32 at the ridge 36, while the segment 38 connects one axial end facing the opening 19 of the surface 33 at the ridge 36.

In use and with reference to figures from 1 to 3, the conduit 3, proceeding from the aperture 4 to the shoulder 5, coaxially accommodates the locking member 14, the sealing ring 10, the spacer 42, the fastening ring 13 and the socket 11.

The bayonet mounts 20 also couple the locking member 14 and the body 6 so as to prevent the sliding parallelly to the axis A of the locking member 14 with respect to the body 6.

More precisely, such coupling occurs by engaging each locator member 21 in the respective seat 22. In particular, each ridge 36 is inserted in the respective groove 27 and each segment 28, 29 cooperates with the respective segments 37, 38.

During the insertion step (FIG. 2), the pipe 2 is coaxially inserted inside the conduit 3 to abut against the socket 11. In this step, the side surface 7 of the pipe 2 sequentially slides inside the locking member 14, the sealing ring 10 and the spacer 42; then, the side surface 7 of the pipe 2 shifts the fins 13 of the fastening ring 12 towards the socket 11; finally, the side surface 7 of the pipe 2 slides inside the socket 11 until it stops against the recess 9 of the socket 11 itself.

At the end of such insertion step (FIG. 2), the pipe 2 remains locked in a predetermined position inside the conduit 3 because it is withheld, on its opposite sides, by the fins 13 and the locking member 14, which is fastened to the body 6 by means of the bayonet mounts 20.

The pipe 2 is also fluid-tightly withheld inside the conduit 3 thanks to the action of the sealing ring 10, which fluid-tightly cooperates with the side surface 7 of the pipe 3 itself.

To obtain the disconnection of the pipe 2 from the conduit 3 (FIGS. 3 and 4), it is sufficient to exert a torque on the locking member 14 so as to firstly determine the release of each ridge 36 from the respective groove 27 and, then, the rotation of the locking member 14 with respect to the body 6 inside the thickening 40 for an arc less than ninety degrees (FIG. 3). At the end of such rotation, the pipe 2 is no longer locked by the locking member 14 and may be disconnected in direction I of the conduit 3 through the opening 4 (FIG. 4).

Since the seat 33 presents two segments 28, 29 converging towards the recess 27, the release of the locking member from the body 1 may be obtained by causing the relative rotation of the locking member 14 with respect to the body 6 in two reciprocally opposite angular directions.

As shown in FIG. 4, during the disconnection step of the conduit 3, the pipe 2 drags the locking member 14, the sealing ring 10, the spacer 42 and the fastening ring 17, which may be recovered by cutting the pipe 3 itself and extracting them from the pipes 3.

From an examination of the features of the coupling 1 made according to the present invention, the advantages that it allows to obtain are apparent.

In particular, the fast-fit coupling 1 allows the pipe 2 to be disconnected from the conduit 3 by turning the locking member 14 with respect to the body 6 for an arc less than ninety degrees.

Therefore, such rotation, extending for a relatively small arc, may be easily performed also in small, restricted spaces.

It is finally apparent that changes and variations can be made to the fast-fit coupling 1 constructed according to the present invention without departing from the scope of protection of the claims.

In particular, the coupling 1 and the locking member 14 may be connected together by means of a single bayonet mount 20.

The invention claimed is:

1. A fast-fit coupling (1) for a fluid circulation system comprising at least two conveying members (2) of a fluid; said coupling (1) comprising:

a receiving body (6) for each of said conveying members (2);

fastening means (13) carried by said body (6), shiftable by said conveying member (2) according to an insertion direction (I) of said conveying member (2) inside said body (6), and integral with said conveying member (2) when said conveying member (2) is moved in a disconnection direction (D) from said body (6) opposite to said insertion direction (I);

locking means (14) adapted to cooperate with said fastening means (13) to lock said conveying member (2) in a predetermined position inside said body (6) and to prevent the disconnection from the body (6) itself;

sealing means (10) adapted to fluid-tightly abut against an external surface of the respective conveying member (2) so as to prevent fluid leakage and interposed between said fastening means (13) and said locking means (14); and releasable constraint means (20) attached to said locking means and activatable for restraining said locking means (14) to said body (6) and preventing said conveying member (2) to be disconnected, and deactivatable for disconnecting said locking means (14) from said body (6) and allowing said conveying member (2) to be disconnected; said locking means (14) and said body (6) being disengageable/engageable by means of a relative rotation;

characterised in that said relative rotation is less than ninety degrees so as to reduce the space needed to reciprocally engage/disengage said locking means (14) and said body (6).

2. A coupling according to claim 1, characterised in that said constraint means (20) comprise a bayonet mount (20) adapted to allow said locking means (14) and said body (6) to be inserted/disconnected.

3. A coupling according to claim 2, characterised in that said bayonet mount (20) comprises a seat (22) defined by one (6) of said locking means (14) and said body (6), and a locator member (21) engageable/disengageable with/from said seat (22) by means of said relative rotation and defined on the other of said lockincg means (14) between said locking means (14) and said body (6).

4. A coupling according to claim 3, characterised in that said seat (22) is delimited by at least one surface (28, 29) converging in a groove (27), and in that said locator member (21) comprises a ridge (35) adapted to remain locked inside said groove (27) to allow the engagement of said locking member (14) in said body (6).

5. A coupling according to claim 4, characterised in that said seat (22) comprises two surfaces (28, 29) converging from opposite sides in said groove (27) so that said relative rotation is possible according to two reciprocally opposite directions.

6. A coupling according to claim 2, characterised in that said bayonet mounts (20) are two and are symmetrically arranged with respect to said direction of insertion.

7. A coupling according to claim 1, characterised in that said locator member (21) is carried by said locking means (14) and in that said seat (22) is carried by said body (6).

* * * * *

UNITED STATES PATENT AND TRADEMARK OFFICE
CERTIFICATE OF CORRECTION

PATENT NO.         : 7,600,788 B2                                           Page 1 of 1
APPLICATION NO.    : 11/556567
DATED              : October 13, 2009
INVENTOR(S)        : Aldo Nicolino It is certified that error appears in the above-identified patent and that said Letters Patent is hereby corrected as shown below:

On the title page, item (73), "Caselett" should be changed to --Caselette--.

Signed and Sealed this

Thirtieth Day of March, 2010

David J. Kappos
*Director of the United States Patent and Trademark Office*